M. F. KETTLER.
CUSHIONED WHEEL.
APPLICATION FILED JAN. 28, 1919. RENEWED SEPT. 12, 1921.

1,413,166.

Patented Apr. 18, 1922.
3 SHEETS—SHEET 1.

INVENTOR.
M. F. Kettler.
BY Lacy & Lacy,
ATTORNEYS

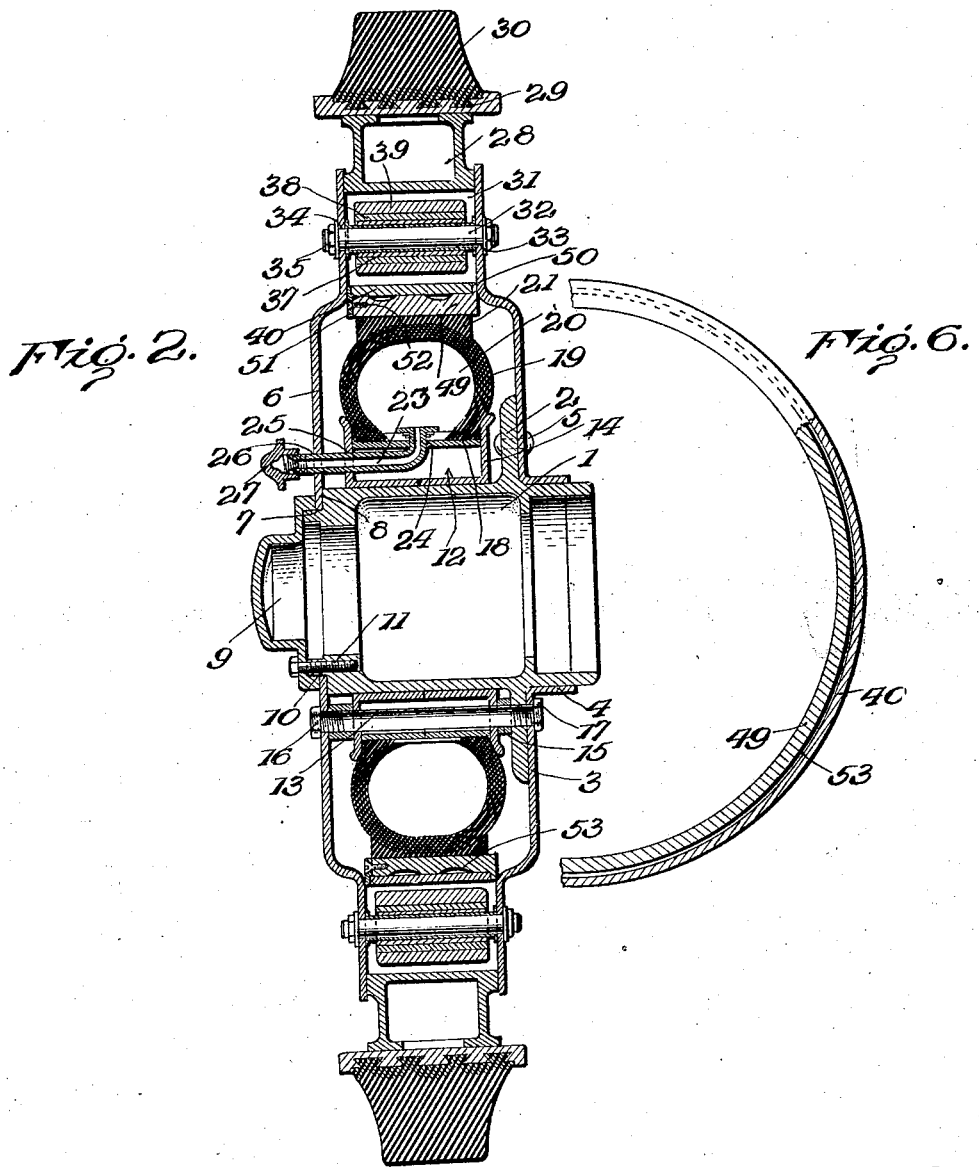

M. F. KETTLER.
CUSHIONED WHEEL.
APPLICATION FILED JAN. 28, 1919. RENEWED SEPT. 12, 1921.
1,413,166.
Patented Apr. 18, 1922.
3 SHEETS—SHEET 3.
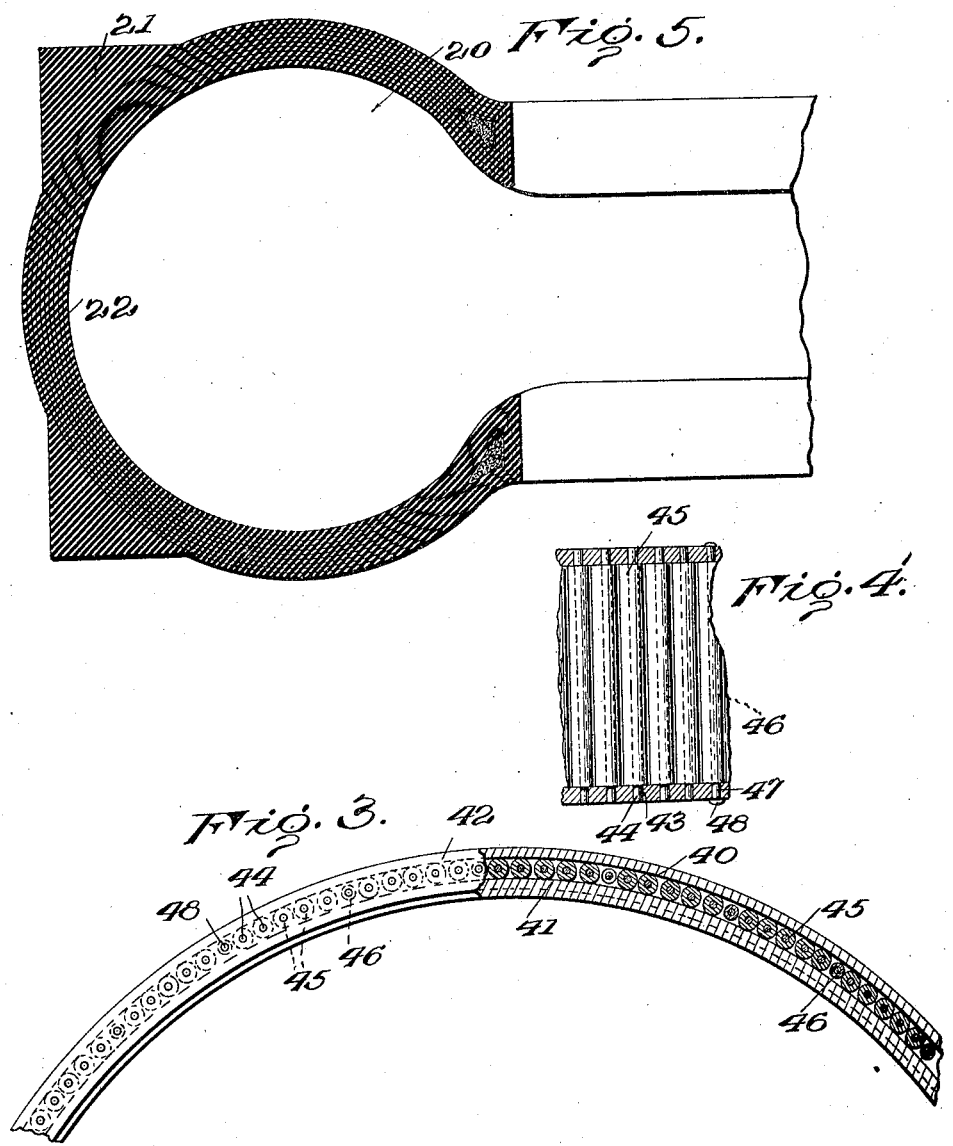
INVENTOR.
M. F. Kettler.
BY
Lacey & Lacey,
ATTORNEYS

UNITED STATES PATENT OFFICE.

MARTIN FRED KETTLER, OF PITTSBURGH, PENNSYLVANIA.

CUSHIONED WHEEL.

1,413,166. Specification of Letters Patent. Patented Apr. 18, 1922.

Application filed January 28, 1919, Serial No. 273,547. Renewed September 12, 1921. Serial No. 500,270.

*To all whom it may concern:*

Be it known that I, MARTIN FRED KETTLER, a citizen of the United States, residing at Pittsburgh, in the county of Allegheny and State of Pennsylvania, have invented certain new and useful Improvements in Cushioned Wheels, of which the following is a specification.

This invention relates to cushioned vehicle wheels and has as its object to provide a cushioned wheel of the solid tire type which will possess the same degree of resiliency and be as effectually cushioned as a wheel having a pneumatic tire, the wheel of the present invention being, however, proof against puncture and possessing none of the disadvantages of the ordinary pneumatic tired wheel.

One of the primary objects of the present invention is to provide a wheel having a floating rim which is equipped with a solid rubber tire but which is pneumatically cushioned with relation to the hub so that the wheel will possess the desired degree of resiliency, the pneumatic cushion, however, being completely housed so as not to be subjected to the deteriorating action of the elements or to injury through contact with objects which might be liable to cut into or puncture it.

More specifically one of the principal objects of the invention is to provide for a positive connection between the seating member for the pneumatic cushion and the hub and face plates of the wheel and to provide an anti-friction bearing between the said cushion and the floating rim of the wheel so that in the relative displacement of the body and rim under driving conditions, there will be no tearing strain imposed upon the pneumatic cushion.

Another important object of the invention resides in a novel arrangement of the inflating valve, this valve being so arranged that it will not be subjected to any strains and its end to which the pump tube is to be connected will be located exteriorly of the body or casing of the wheel so that no difficulty will be experienced in inflating the pneumatic cushion and it will not be required to remove or dismount any of the parts of the wheel for this purpose.

The invention further contemplates certain novel detail features which will be presently more specifically described and set forth in the claims.

In the accompanying drawings:

Fig. 2 is a diametrical sectional view through a modified form of wheel;

Fig. 3 is a view partly in side elevation and partly in section illustrating the anti-friction means embodied in the form of wheel shown in Fig. 1;

Fig. 4 is a fragmentary plan view of the structure shown in Fig. 3;

Fig. 5 is a detail sectional view through a portion of the pneumatic cushion;

Fig. 6 is a vertical sectional view in a plane at right angles to the plane of Fig. 2 illustrating the anti-friction means provided in that form of the invention shown in Fig. 2.

Figure 1:
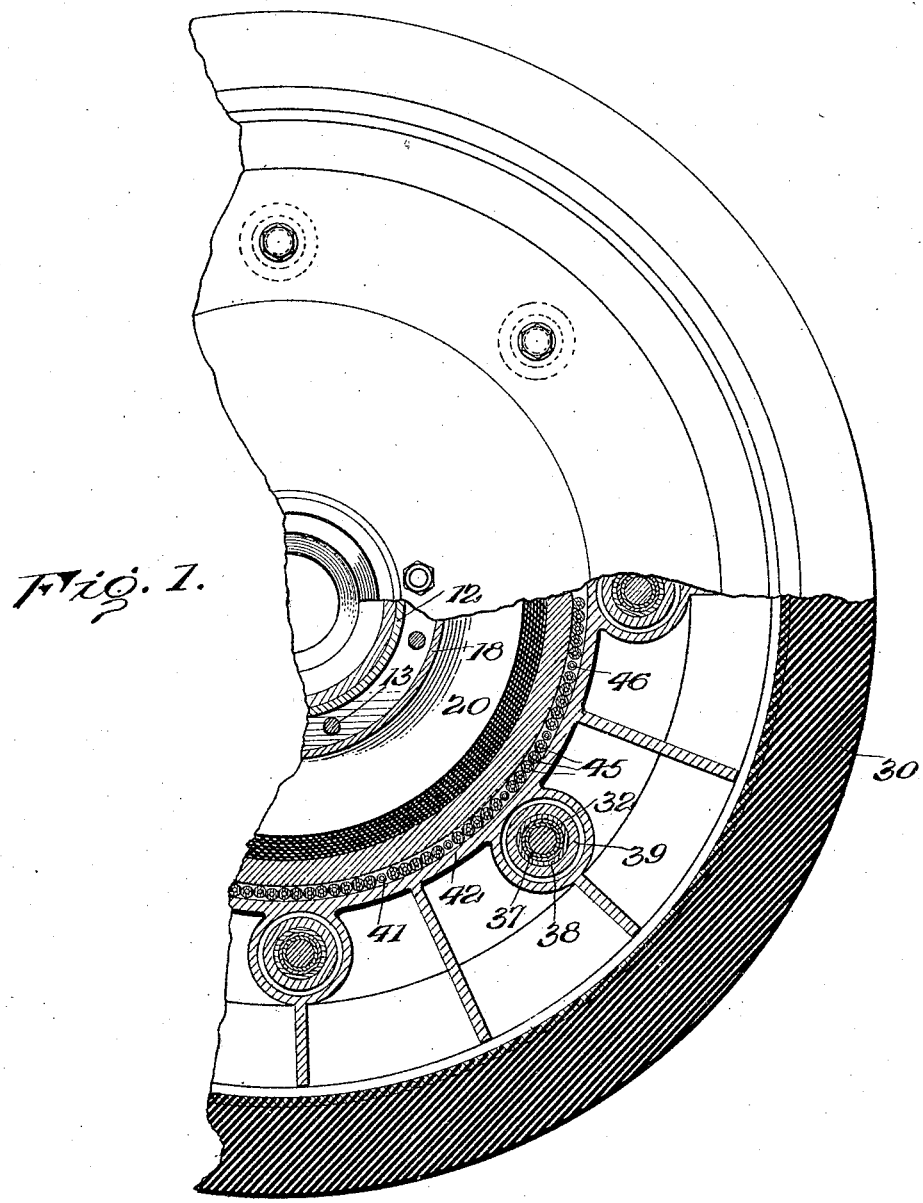
Figure 1 is a view partly in side elevation and partly in vertical section illustrating one form of wheel embodying the present invention.

As aside from the anti-friction bearing between the pneumatic cushion and the floating rim of the wheel, the two forms of wheel illustrated are identical in their construction, parts which are common to the two forms will be indicated by corresponding reference numerals. In both forms of the invention the hub of the wheel is indicated in general by the numeral 1, the said hub being interiorly formed so as to fit the spindle upon which the wheel is to be rotatably mounted. This hub is provided near its inner end and exteriorly with a circumscribing flange 2 and fitted onto this end of the hub and resting at its inner face against the said flange, is the inner face plate of the wheel body indicated by the numeral 3, this face plate at its center and surrounding the opening which receives the said end of the hub, being formed with a laterally extending bearing flange 4 fitting the hub end. In addition to means to be presently more specifically described, rivets or other suitable securing elements 5 are employed for securing the face plate 3 to the flange 2 so that this face plate constitutes in effect an integral part of the hub and is, consequently, rigid with relation thereto. The outer face plate of the wheel body is indicated by the numeral 6 and is formed at its central portion with an opening 7 adapting it to be fitted onto the outer end of the hub, the inner face of the face plate at its portion surrounding the opening 7 resting against a shoulder 8 which circumscribes this end of the hub. This face plate 6 is held rigid with relation to the hub in part by means of a hub cap 9 adapted for disposal against the outer end of the hub and having a peripheral flange 10 fitting the said end of the hub, bolts 11 being secured through the marginal portion of the cap and into the end of the hub.

As before stated, the wheel embodies a cushioning member housed within the body of the wheel, and the cushion is fitted upon a seating member indicated in general by the numeral 12 and comprising an annular body split circumferentially to comprise two sections which are fitted together and upon the intermediate portion of the hub, snugly surrounding the said hub and secured together and rigid with relation to the hub and to the face plates of the wheel body, by means of bolts 13 which are fitted through aligned openings in outstanding flanges 14 constituting a part of the seating member 12, through the face plates 3 and 6, the flange 2, and spacing collars 15 and 16 which latter are fitted upon the end portions of the bolts and bear respectively between the flange 2 of the hub and the adjacent flange 14 of the seating member, and between the face plate 6 and the adjacent flange of the said seating member. Nuts 17 are threaded onto the ends of the bolts 13 and bear against the outer faces of the face plates 3 and 6. It will now be evident that the seating member 12 is held rigid with relation to the hub and to the face plates of the wheel body and consequently cannot turn upon the hub or become otherwise displaced with relation thereto. The seating member 12 further includes a bridge portion 18 which extends between the flanges 14 and is rigid with the said flanges, being, however, divided circumferentially as before explained, so as to permit of the two sections of the seating member and the pneumatic cushion being conveniently assembled.

The pneumatic cushion is indicated in general by the numeral 19 and the same comprises a body open around its inner side so as to permit of the introduction thereinto of a pneumatic tube 20. The outer side of the body 19 of the casing is thickened, as indicated by the numeral 21, and its central portion is normally outwardly bulged, as indicated by the numeral 22. At opposite sides of the portion 22, the casing is peripherally cylindrical and when the said casing has applied to it the anti-friction bearing member to be presently explained, its portion 22 will be forced inwardly so that the entire outer periphery of the casing will then assume a cylindrical form, as clearly shown in Fig. 2 of the drawings, and, of course, when the pneumatic tube 20 is inflated, the outer side of the casing will be caused to so snugly bind within the anti-friction member as to practically connect these parts together.

In order that the tube 20 may be inflated, an inflating valve having a stem 23 is suitably connected with the said tube and after extending through an opening 24 in the bridge member 18, is directed laterally and through aligned openings 25 and 26 in the outer flange 14 of the seating member and the face plate 6, the projecting or exteriorly located end of the valve stem being normally closed by a cap 27 which may be removed to provide for the attachment thereto of the pump tube when it is desired to inflate the cushion. It will be evident that by this arrangement the stem of the inflating valve is not subjected to any strain, nor is the connection of the valve with the pneumatic tube 20 liable to be disturbed. Also it will be evident that the pneumatic tube may be inflated without the necessity of dismounting any portion of the wheel body in order to gain access to the inflating valve.

Before proceeding to a description of the two forms of anti-friction devices provided between the pneumatic cushion and the floating rim, I will first describe the said rim and the means provided for establishing a driving connection between the hub and rim. The numeral 28 indicates in general the floating rim and this rim is disposed between the marginal portions of the face plates 3 and 6 so that it may have variable movement radial to the hub 1. The rim is provided with any suitable means, as indicated by the numeral 29, to seat any desired type of solid rubber tire indicated by the numeral 30. At intervals the rim is formed with transversely extending cylindrical openings or pockets 31 which open through the opposite side faces of the rim. The numeral 32 indicates bolts which are shouldered at their ends and have their reduced ends fitted through openings 33 and 34 formed in aligned position through the said marginal portions of the face plates of the wheel body, nuts 35 being applied to the ends of these bolts and bearing against the outer faces of the said face plates so as to secure the said marginal portions of the said plates to the bolts, the shouldered ends of the bolts serving to suitably space these portions of the face plates to permit of the ready movement therebetween of the said floating rim. A sleeve 37 of any suitable bearing metal has vulcanized upon it a hard rubber sleeve indicated by the numeral 38 and this sleeve 38 in turn has vulcanized upon it a soft rubber sleeve 39 of an external diameter less than the diameter of the respective opening 31. The sleeve 37 is rotatably fitted upon the respective bolt 32 so that the buffers comprising the sleeves 37, 38 and 39 may rotate freely upon the bolts and will be adapted to have bearing against different portions of the walls of the openings 31 under driving conditions.

The inner peripheral portion of the body of the rim is indicated by the numeral 40 and is cylindrical and smoothly finished. In that form of anti-friction means illustrated in Figs. 1, 3 and 4 of the drawings, the numeral 41 indicates an annulus interiorly cylindrical and disposed to surround the casing 19 for the pneumatic tube 20, this annulus being provided with flanges 42 having openings 43 formed therein to receive small trunnions 44 at the ends of anti-friction rollers 45 disposed within the channel formed by the said flanges and the outer peripheral surface of the annulus 41. One of the flanges, in order to permit of convenient assemblage of the rollers, is preferably formed separate from the annulus 41, and in order to secure the flange in place after the rollers have been assembled, transverse pins 46 of less diameter than the rollers 45, are provided and are reduced at their ends as at 47 and fitted at their ends through certain of the openings 43 and then riveted down as at 48. The rollers 45 ride against the inner side of the inner peripheral portion 40 of the floating rim, as clearly shown in Figs. 1 and 3 of the drawings, and thus while the annulus 41 is in effect held rigid with relation to the casing 19, the said annulus and the floating rim may have relative rotative movement without any appreciable friction due to the provision of the said rollers 45.

In that form of the invention shown in Figs. 2 and 6 of the drawings, an annulus 49 is substituted for the annulus 41 and is provided at one side with an outstanding flange 50 and at its other side with a flange 51 which latter is, however, removable and is secured in place by means of screws or other suitable fastening elements 52. The flanges 50 and 51 engage the sides or edges of the inner peripheral portion 40 of the floating rim so as to prevent lateral displacement of these parts as in the instance of the annulus 41 heretofore described. In this particular form of the invention, however, the rollers are not employed but in their stead, the outer surface of the annulus 49 is formed with circumferentially extending channels 53 designed to receive lubricant which will serve to reduce friction between the annulus and the said inner peripheral portion 40 of the floating rim.

From the foregoing description of the invention it will be understood that under running conditions, the buffer sleeves 39 will be brought into engagement with various portions of the walls of the openings 30 so as to connect the wheel body and floating rim for movement in unison. However, due to the fact that the rim may float with relation to the body, and due to the further fact that the pneumatic cushion is provided between the hub and the rim, the axis of the rim may be displaced with relation to the axis of the hub when obstructions are met with, although the cushion will tend to maintain these axes in coincidence.

Having thus described the invention, what is claimed as new is:

1. In a cushioned wheel, a hub, a seating member surrounding the hub and rotatable therewith, a pneumatic cushion upon the seating member initially outwardly bulged at the intermediate portion of its outer side, a floating rim, driving connection between the hub and rim, and a bearing member having anti-friction contact with the rim and surrounding the said cushion and of an internal diameter less than that of the cushion at its bulged portion whereby when the cushion is inflated the said bulged intermediate portion of its outer side will be caused to frictionally bind the inner surface of the bearing member to hold the bearing member and cushion against relative displacement.

2. In a cushioned wheel, a hub, a pneumatic cushion surrounding the hub, a bearing member surrounding the cushion, anti-friction bearing elements mounted in the outer face of the said bearing member, and a floating rim surrounding the bearing member and at its inner periphery contacting the said bearing elements.

3. In a cushioned wheel, a hub, a pneumatic cushion surrounding the hub, a bearing member surrounding the cushion, a flange projecting at one side of the said bearing member, a flange removably secured at the other side of the bearing member, anti-friction rollers mounted between the flanges, and a floating rim surrounding the bearing member and at its inner periphery contacting the said bearing elements.

4. In a cushioned wheel, a hub, a pneumatic cushion surrounding the hub, a bearing member surrounding the cushion, flanges projecting at the opposite sides of the bearing member, rollers having terminal spindles rotatably mounted in the flanges, spacing pins extending transversely between the flanges and secured at their ends thereto and of less diameter than the rollers, and a floating rim surrounding the bearing member and at its outer periphery contacting the said bearing rollers.

In testimony whereof I affix my signature.

MARTIN FRED KETTLER. [L. S.]